(12) United States Patent
Smith

(10) Patent No.: US 7,584,542 B2
(45) Date of Patent: *Sep. 8, 2009

(54) TRIMMER

(75) Inventor: Ian Zetterstrom Smith, Yorkshire (GB)

(73) Assignee: Husqvarna UK Limited, Newyton Aycliffe (GB)

( * ) Notice: Subject to any disclaimer, the term of this patent is extended or adjusted under 35 U.S.C. 154(b) by 9 days.

This patent is subject to a terminal disclaimer.

(21) Appl. No.: 10/699,974

(22) Filed: Nov. 3, 2003

(65) Prior Publication Data

US 2004/0148918 A1 Aug. 5, 2004

(30) Foreign Application Priority Data

Nov. 4, 2002 (GB) .................................. 0225685.7

(51) Int. Cl.
*B26B 7/00* (2006.01)

(52) U.S. Cl. .............................. 30/276; 30/347; 172/17; 56/12.7

(58) Field of Classification Search ................... 30/319, 30/320, 321, 286, DIG. 5, 529, 276, 347; 172/14, 17; 56/16.7, 12.7, 16.9, 17.1, 17.5
See application file for complete search history.

(56) References Cited

U.S. PATENT DOCUMENTS

| RE21,274 | E | | 11/1939 | Orr | |
|---|---|---|---|---|---|
| 2,608,043 | A | * | 8/1952 | Berdan | 56/17.2 |
| 3,221,481 | A | * | 12/1965 | Mattson et al. | 56/16.9 |
| 3,609,864 | A | * | 10/1971 | Bassett | 30/261 |
| 4,043,101 | A | * | 8/1977 | Lahr et al. | 56/17.1 |
| 4,360,971 | A | | 11/1982 | Fellmann | |
| 4,364,435 | A | | 12/1982 | Tuggle et al. | |
| 4,442,659 | A | * | 4/1984 | Enbusk | 56/12.7 |
| 5,107,665 | A | * | 4/1992 | Wright | 56/12.7 |
| 5,325,928 | A | * | 7/1994 | Wagster et al. | 172/15 |
| 5,558,057 | A | * | 9/1996 | Everts | 123/195 R |
| 5,603,205 | A | * | 2/1997 | Foster | 56/16.7 |
| 5,635,423 | A | | 6/1997 | Huang et al. | |
| 5,651,418 | A | * | 7/1997 | Jerez | 172/14 |
| 5,821,169 | A | | 10/1998 | Nguyen et al. | |
| 6,087,250 | A | | 7/2000 | Hyakutake | |

(Continued)

FOREIGN PATENT DOCUMENTS

DE 30 10 092 A1 9/1981

(Continued)

OTHER PUBLICATIONS

S. Wolf and R.N. Tauber, Silicon Processing for VLS/Era, vol. 1—Process Technology, pp. 797-799, Second Edition (2000) Published by Lattice Press, Sunset Beach, CA.

(Continued)

*Primary Examiner*—Boyer D Ashley
*Assistant Examiner*—Omar Flores-Sánchez

(57) ABSTRACT

A trimmer comprises a cutting head (1) housing a cutter (5), and an elongate shaft (2) for supporting the cutting head. The cutting head (1) is connected to the shaft (2) by connection means (3) permitting the cutting head (1) to be positioned with the cutter (5) either substantially horizontal or substantially vertical. The connection means (3) is such that, when the cutter (5) is substantially vertical, the longitudinal axis of the shaft (2) is parallel to the plane of rotation of the cutter.

13 Claims, 5 Drawing Sheets

U.S. PATENT DOCUMENTS

Figure 1:
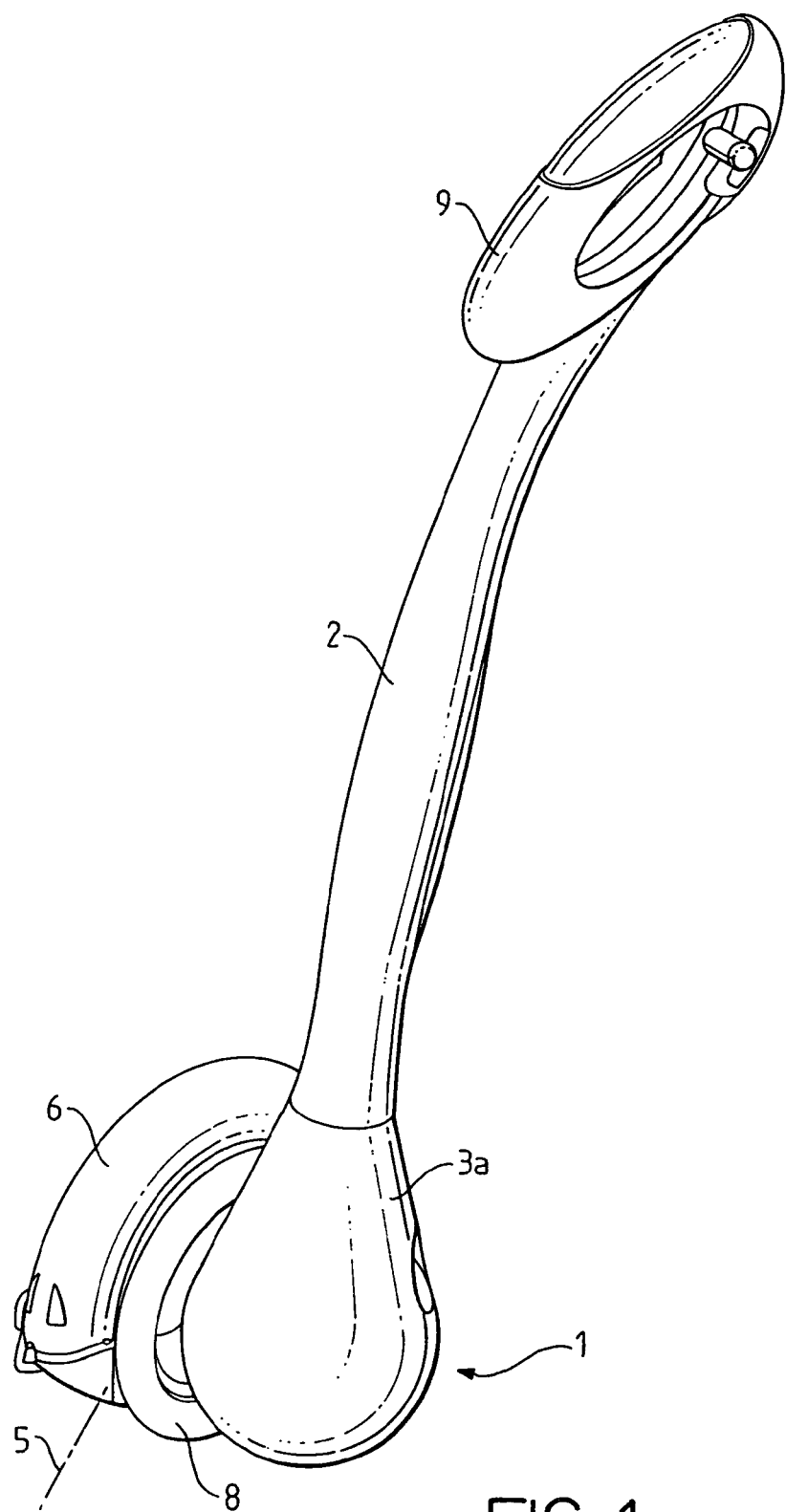

| | | | |
|---|---|---|---|
| 6,143,646 | A | 11/2000 | Wetzel |
| 6,150,073 | A | 11/2000 | Huang |
| 6,154,967 | A * | 12/2000 | Rogala .................... 30/292 |
| 6,156,643 | A | 12/2000 | Chan et al. |
| 6,221,759 | B1 | 4/2001 | Bothra et al. |
| 6,225,217 | B1 | 5/2001 | Usami et al. |
| 6,255,735 | B1 | 7/2001 | Wang et al. |
| 6,260,278 | B1 * | 7/2001 | Faher ...................... 30/276 |
| 6,312,874 | B1 | 11/2001 | Chan et al. |
| 6,468,898 | B1 | 10/2002 | Usami |
| 6,479,391 | B2 | 11/2002 | Morrow et al. |
| 6,507,081 | B2 | 1/2003 | Smith et al. |
| 6,516,598 | B1 * | 2/2003 | Notaras et al. ............ 56/16.7 |
| 6,651,347 | B2 * | 11/2003 | Uhl .......................... 30/383 |
| 6,997,268 | B2 * | 2/2006 | Smith ....................... 172/14 |
| 2001/0004550 | A1 | 6/2001 | Passemard |
| 2001/0034940 | A1 | 11/2001 | Marshall et al. |
| 2003/0100190 | A1 | 5/2003 | Cote et al. |

FOREIGN PATENT DOCUMENTS

| | | |
|---|---|---|
| EP | 0 005 540 | 11/1979 |
| EP | 0 296 789 | 12/1988 |
| EP | 0 976 313 | 12/1993 |
| GB | 747292 | 4/1956 |
| WO | WO 01/43171 A1 | 6/2001 |
| WO | WO 01/99184 A2 | 12/2001 |

OTHER PUBLICATIONS

Vincent Arnal et al., A Novel SIO2-Air Gap Low K For Copper Dual Damascene Interconnect, Advanced Metalization Conference 2000, D. Edelstein et al., Warrendale, PA, USA, pp. 71-76.

S. Purushothaman et al., Opportunities and Challenges in Ultra Low k Dielectrics for Interconnect Applications, IEEE, 2001, pp. IEDM 01-529-532.

Lytle et al., Overcoming Cu/CVD Low-k Integration Challenges in a High Performance Interconnect Technology, IEEE 2001, pp. IEDM 01-611-614.

Zielinski et al., Damascene Integration of Copper and Ultra-Low-k Xerogel For High Performance Interconnects, 1997, pp. IEDM 97-936-938.

Arnal et al., Integration of a 3 Level Cu-SiO2 Air Gap Interconnect for Sub 0.1 micron CMOS Technologies, 2001 IEEE, pp. 298-300.

* cited by examiner

TRIMMER

This invention relates to a grass trimming device which is capable of being switched between at least two alternative configurations which are suitable for grass trimming and edge trimming respectively.

A known grass trimming device (trimmer) comprises a cutting head mounted at one end of a shaft, an operator handle being positioned at the other end of the shaft. The cutting head includes a cutter constituted by a rotatable blade or a rotatable flexible cutting line. The cutting head can be moved relative to the shaft, to position the cutter generally horizontal for grass trimming and generally vertical for edge trimming.

DE-A-3 010 092 describes a known trimmer of this type, the trimmer having a handle that can be moved from a first socket on the cutting head to a second socket on the same head, in order to shift the cutting head from a configuration in which the cutter plane is horizontal for grass trimming to a configuration in which the cutter is vertical for edge trimming. In both configurations of the device, a shaft fitted to the handle is directed upwardly towards the operator. This device suffers from the drawback that changing from one function to the other is difficult, because it is necessary to release and then remove the handle from one socket, and then replace it and lock it into position in the second socket.

EP-A-0 005 540 shows a similar device where the handle is pivotally adjustable in a plane which is perpendicular to the cutting plane. Changing the configuration of this device requires releasing a handle catch, turning the handle through 180°, releasing the cutting head, and then adjusting it to the required angle. Moreover, a relatively complex arrangement of parts is necessary to achieve the changeover. This results in considerable expense, and a risk that the components, which are not totally covered may be damaged by the ingress of dirt and debris.

EP-A-0 296 789 describes a trimmer in which the shaft includes a coupling section to which the cutting head is pivotally attached. The cutting head includes a surface defining a parting plane at which plane the coupling section is coupled to the cutting head. The parting plane, extends laterally with respect to the shaft, so that relative movement at the parting plane between the coupling section and the cutting head is about an axis which is perpendicular to the parting plane and obliquely to the shaft, so that relative movement between the coupling section and the cutting head about the parting plane positions the cutter in grass trimming and edge trimming configurations.

Each of the trimmers described above is relatively easy to operate when in the trimming configuration. However, when in the edging configuration, the user must stand at right-angles to the edge of a lawn being trimmed, and move sideways along that edge as trimming progresses. This is disadvantageous, in that it is difficult to align the cutter accurately with the edge of the lawn (owing to the eye of the user not being in alignment with the lawn edge), and this can lead to a poor edging performance. Moreover, each of the known trimmers requires a relatively complex series of operations to convert between trimming and edging configurations.

The aim of the invention is to provide a trimmer having improved edging capabilities.

The present invention provides a trimmer comprising a cutting head housing a cutter means, and an elongate shaft for supporting the cutting head, the cutting head being connected to the shaft by connection means permitting the cutting head to be positioned with its cutter means either substantially horizontal or substantially vertical without disconnecting the cutting head and the shaft, the shaft having a hand-grippable portion at a position remote from the cutting head, the arrangement being such that the line joining a point within the hand-grippable portion and the connection means is substantially parallel to plane of rotation of the cutter means when the cutter means is substantially vertical.

Preferably, the connection means is such that the cutting head is movable between positions in which its cutter means is substantially horizontal and substantially vertical in a single movement.

Advantageously, the connection means is such that the cutter means is movable between the substantially horizontal position and the substantially vertical position by an effective rotation of the cutting head relative to the handle of 120° in one direction or 240° in the other direction. Preferably, the connection means is constituted by a rotatable joint. In this case, the rotatable joint is such that the cutting head is movable between positions in which its cutter means is substantially horizontal and substantially vertical about a single axis.

In a preferred embodiment, the axis of rotation of the rotatable joint lies substantially at 35.5° to the plane of rotation of the cutter means, and lies substantially at 35.5° to the horizontal when the cutting head is positioned with the cutter means either substantially horizontal or substantially vertical.

Connection means of this nature enables the cutting head to be moved between a trimming mode (in which the cutter means is substantially horizontal) and an edging mode (in which the cutter means is substantially vertical) by a simple rotation of the cutting head relative to the shaft. A particular advantage of this connection means is that the elongate shaft is generally aligned with a lawn edge in the edging mode, so that the user can carry out an edging operation when positioned behind the cutting head and moving forwards (or backwards) along the edge portion of the lawn.

Advantageously, the rotatable joint is constituted by a ball-and-socket joint. Preferably, the ball is fixed to the cutting head, and the socket is defined by a generally spherical socket portion formed at the end of the shaft remote from the hand-grippable portion.

The trimmer may further comprise a motor for driving the cutter means. Conveniently, the cutter means is rotatable, and the drive engagement between the motor and the cutter means is a rotatable drive engagement. Preferably, the motor is housed within the ball, and is an electric motor.

Preferably, a rotatable cutter line constitutes the cutter means,

In a preferred embodiment, the trimmer further comprises a wheel rotatably mounted on the cutting head. The axis of rotation of the wheel may be substantially coincident with the axis of rotation of the cutter means. Advantageously, the radius of the wheel is of the order of, but slightly less than, the effective radius of the cutter means.

The invention also provides a cutting head housing a cutter means, and a shaft for supporting the cutting head, the cutting head being adjustably mounted with respect to the shaft by connection means enabling the cutter means to be moved between substantially vertical and substantially horizontal positions by adjusting the position of the cutting head relative to the shaft by an effective rotation of 120° in one direction or 240° in the other direction.

The invention further provides a cutting head housing a cutter means, and a shaft for supporting the cutting head, the cutting head being rotatably mounted with respect to the shaft by means of a rotatable joint whose axis of rotation lies substantially at 45° to the plane rotation of the cutter means, and lies substantially at 45° to the horizontal when the cutting head is positioned with its cutter means either substantially horizontal or substantially vertical.

Figure 2:
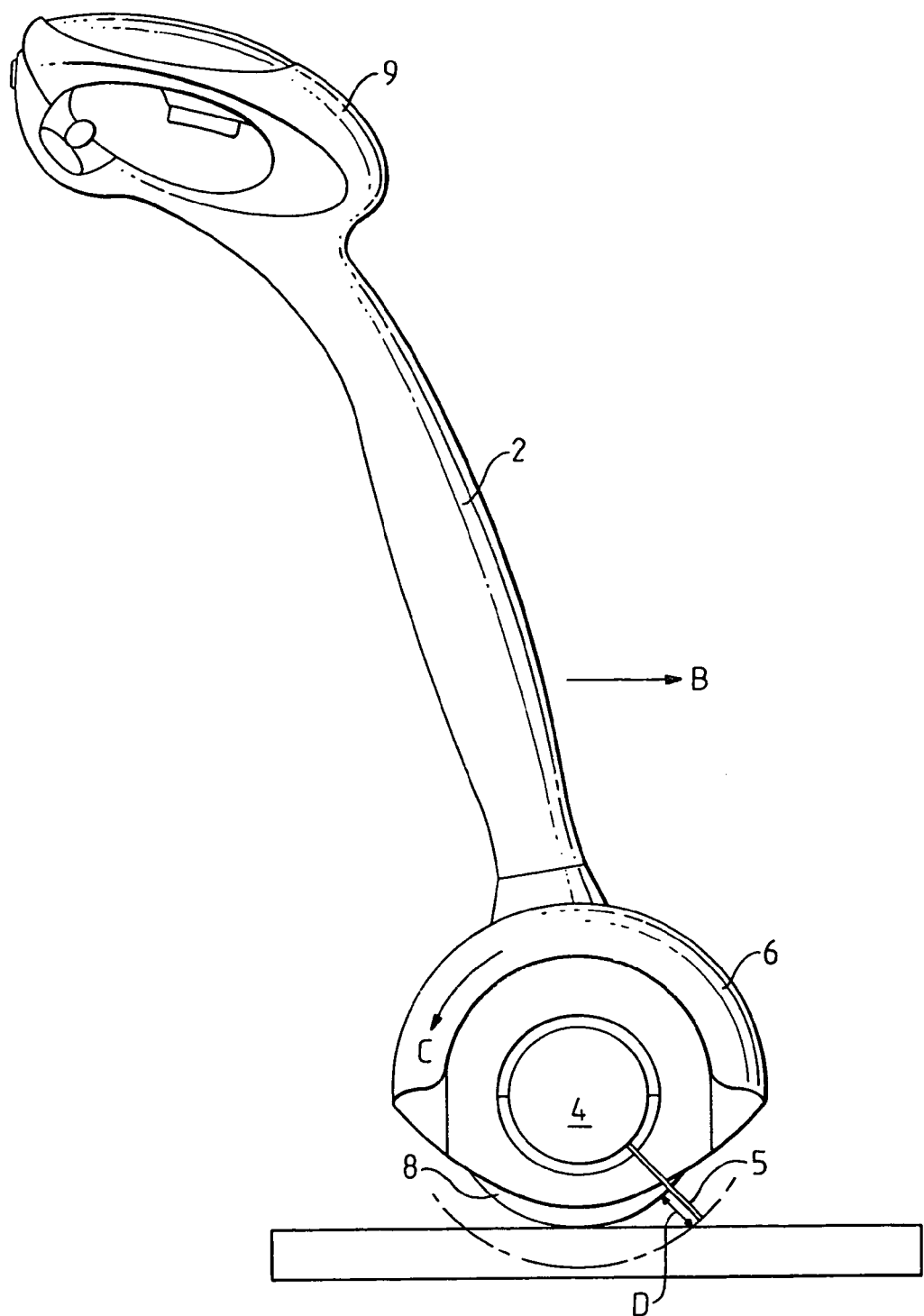
Figure 3:
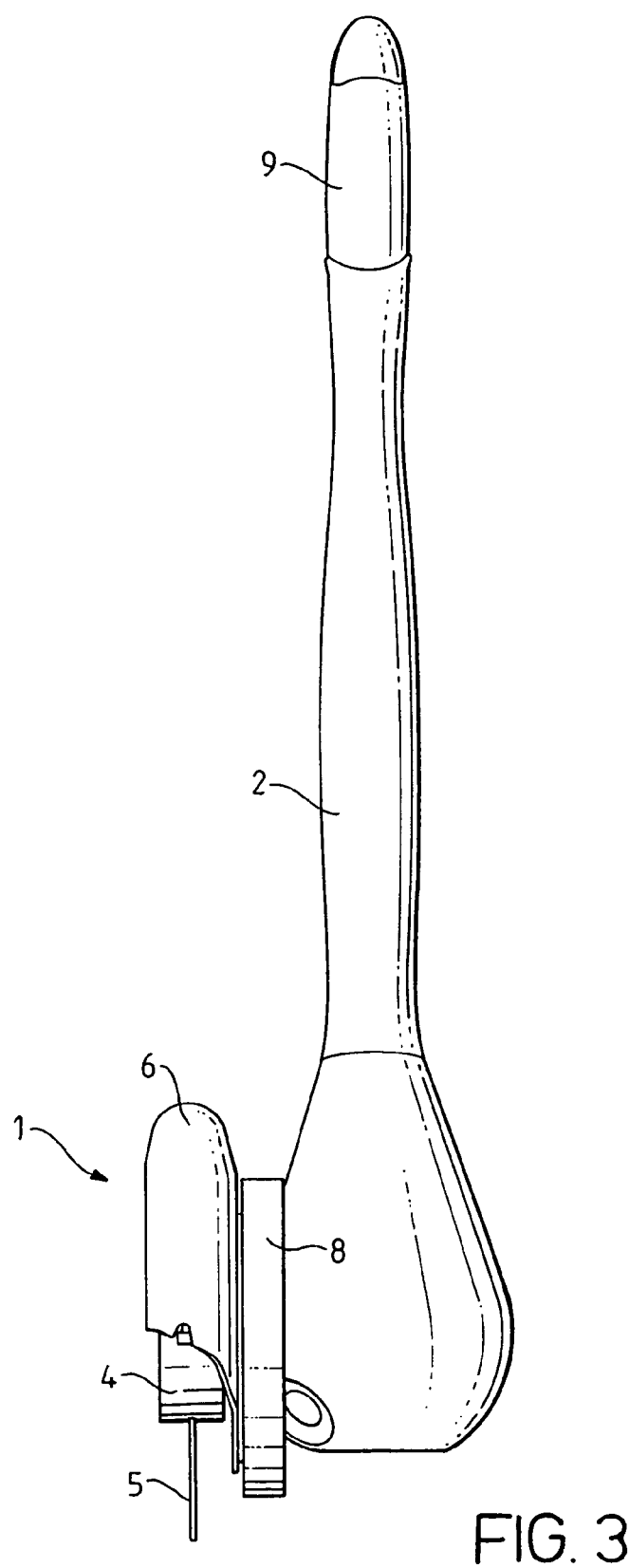
Figure 4:
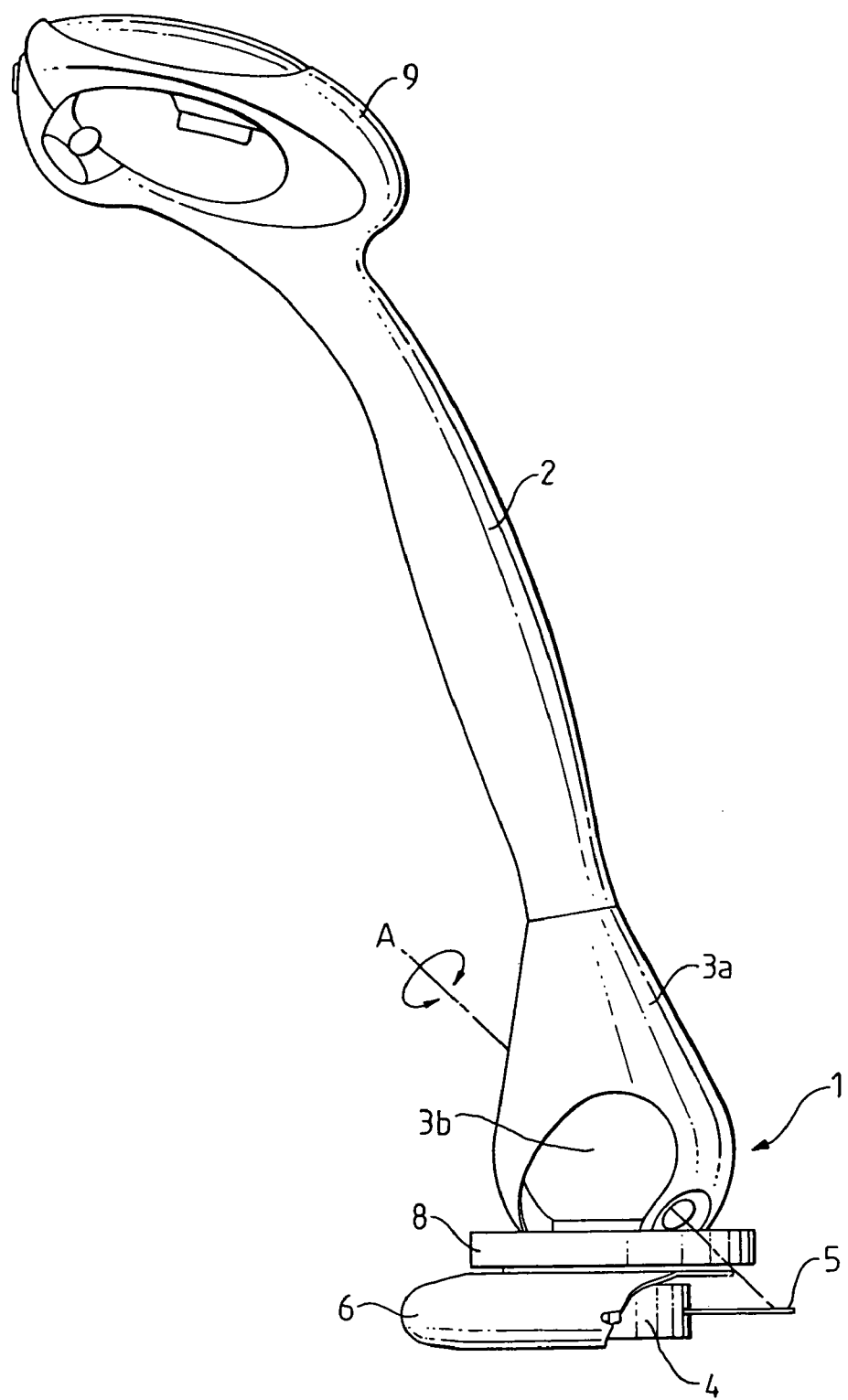
Figure 5:
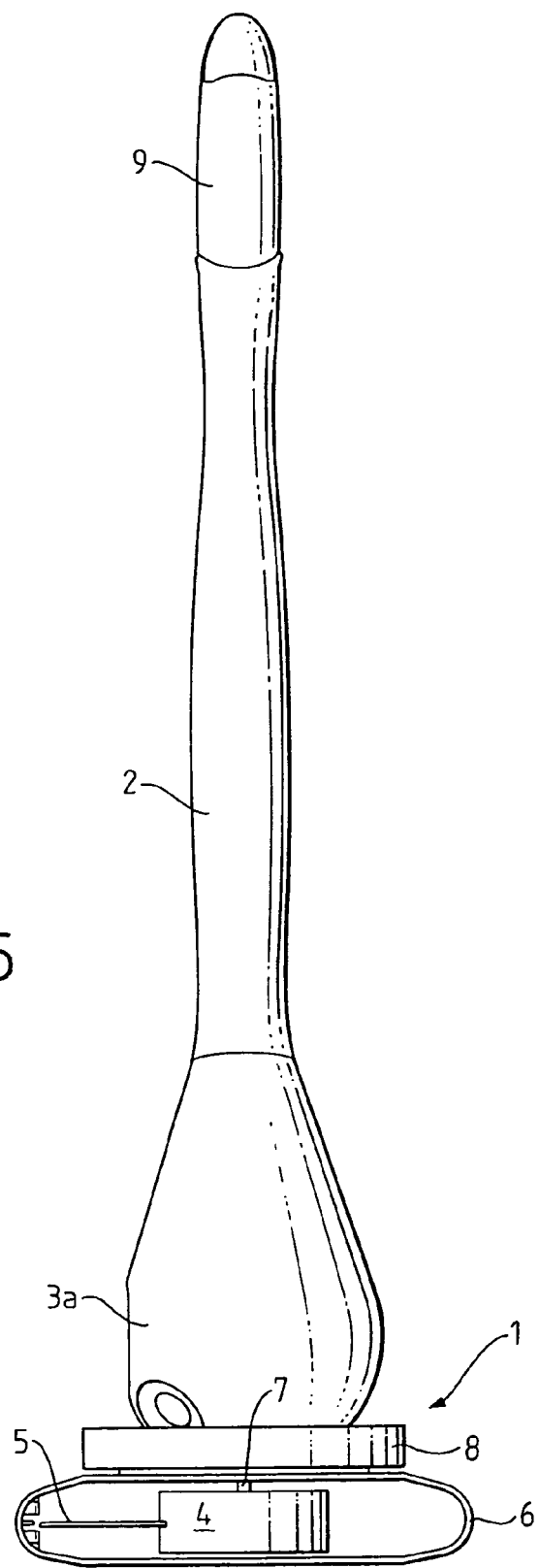

A trimmer constructed in accordance with the invention will now be described, by way of example, with reference to the drawings, in which:

FIG. 1 is perspective view of the trimmer;
FIG. 2 is a side elevation of the trimmer in edging mode;
FIG. 3 is a front elevation of the trimmer in edging mode;
FIG. 4 is a side elevation of the trimmer in trimming mode; and
FIG. 5 is a front elevation of the trimmer in trimming mode.

As shown in the drawings, the trimmer comprises a cutting head 1 which is connected to a shaft 2 by means of a ball-and-socket joint 3. The joint 3 is constituted by a housing 3a, which is integrally formed with the shaft 2, and a ball 3b which is fixed to the cutting head 1. The housing 3a defines a generally spherical socket which complements the shape of the ball 3b. The shaft 2 and the housing 3a are made of a plastics material such as ABS or polypropylene, and the ball 3b is made of a plastics material such as ABS or polypropylene. The cutting head 1 includes a rotatable hub 4 which houses a coiled up flexible cutter line (only the free end of portion 5 of which can be seen in the drawings). The cutter line 5 exits the hub 4 via an aperture 4a, and can be fed out (in known manner) as the cutter line wears. The axis A of rotation of the joint 3 (see FIG. 4) lies at an angle of substantially 35.5° to the plane of rotation of the cutter line 5.

The cutting head 1 is also provided with a guard 6 made of a plastics material such as ABS or polypropylene. The guard 6 partially surrounds the hub 4 and the cutter line 5 in such a manner that the cutter line has an effective cutting range which extends somewhat less than 180°. The hub 4 is rotatably driven by an electric motor (only the output shaft 7 of which can be seen), the motor being housed within the ball 3b. A wheel 8 made of a plastics material such as ABS or polypropylene is mounted between the guard 6 and the housing 3a, the wheel being rotatable relative to the guard about the axis of the motor shaft 7, and having a radius that is slightly less than the effective radius of the cutter line 5. A band grip 9 is provided at the free (upper) end of the shaft 2.

FIGS. 2 and 3 show the trimmer 1 in the edging position, that is to say with the cutting head 1 positioned so that the cutter line 5 is generally vertical. In this position, as shown in FIG. 2, the rim of the wheel 8 can be positioned on a lawn adjacent to the edge thereof, so that the cutter line 5 is positioned for an edging operation. The trimmer can then be advanced along the edge of the lawn to carry out the edging operation. As shown in FIG. 2, the distance between the effective radius of the cutter line 5 and the radius of the wheel 8 defines the depth of cut (cutting swathe) which can be effected with the trimmer in the edging position. In FIG. 2, arrow B indicates the edging direction (that is to say the direction in which the trimmer is moved during edging), arrow C indicates the cutting direction (that is to say the direction of rotation of the cutter line 5), and double-headed arrow D indicates the depth of cut (the cutting swathe) of the cutter line 5.

In order to change the trimmer from its edging mode to its trimming mode, it is necessary only to rotate the cutting head 1 relative to the shaft 2, through either 120° in one direction, or 240° in the other direction. FIGS. 4 and 5 show the trimmer with the cutting head 1 in the trimming position, that is to say with the cutter line 5 generally horizontal. In either position, the axis of rotation of the joint 3 lies at an angle of substantially 35.5° to the horizontal.

One advantage of the 120° or 240° rotational angle necessary to convert between the two modes is that, in the edging mode, the shaft 2 is generally aligned with the edge of the lawn, so that the user can carry out an edging operation when positioned behind the cutting head 1 and moving forwards (or backwards) along the edge of the lawn. This enables the user to line up the cutter line 5 with the edge of the lawn, because the user's eye can be positioned substantially in the plane of the lawn edge. This is to be contrasted with known trimmers, in which the user faces the edge of the lawn when the trimmer is in the edging position, and has to move sideways parallel to the lawn edge to carry out an edging operation. Clearly, in this position, the user cannot line up the cutter line accurately with the lawn edge. A further advantage of the trimmer described above is that, with the trimmer in the edging configuration as shown in FIG. 2, the direction of rotation of the cutter line 5 is such as to throw cut grass and debris directly away from the user, that is to say at 180° to the user. This is because the user is positioned "behind" the cutting head. This is to be contrasted with known trimmer/edgers, in which the user stands at substantially 90° to the edge of the lawn (and hence to the plane of rotation of the cutter). Accordingly, there is less chance of the user of the trimmer of the present invention being hit by flying debris than with known devices.

Another advantage of the trimmer described above is that the joint about which the cutting head 1 rotates is low down, thereby reducing the difference in the height of the band grip 9 when the trimmer is in the edging and trimming modes.

A further advantage of this trimmer is that the wheel 8 which has a relatively large diameter. The trimmer can, therefore, handle uneven lawn surfaces rather better than known wheeled trimmers which typically have a small wheel hanging off the front of the cutting head.

Yet another advantage of this trimmer is the ease with which it can be converted from the trimming mode to the edging mode and vice versa. Thus, a simple, single movement (a rotation of the housing 3a relative to the ball 3b) only is needed for such conversions, and this can be accomplished by rotating the housing with one hand whilst holding the shaft 2 or the hand grip 9 with the other hand.

It will be apparent that modifications could be made to the trimmer described above. For example, in order to facilitate two-handed operation, an additional hand grip could be provided at the front of the shaft 2 adjacent to the top thereof.

The invention claimed is:

1. A trimmer comprising a cutting head housing a cutter means, and a shaft for supporting the cutting head, the cutting head being rotatably mounted with respect to the shaft by means of a rotatable joint whose axis of rotation is oriented in a first orientation, wherein the axis of rotation in the first orientation lies substantially at 35.5° relative to the plane of rotation of the cutter means when the cutter means is in a substantially horizontal position, and the axis of rotation also lies in the first orientation when the cutting head is positioned with the cutter means in a substantially vertical position.

2. A trimmer comprising a cutting head housing a cutter means, and a shaft for supporting the cutting head, the cutting head being adjustably mounted with respect to the shaft by connection means that defines a fixed axis of rotation, wherein the cutting head is adjusted relative to the shaft when the cutting head is rotated about the axis of rotation, the connection means enabling the cutter means to be moved between substantially vertical and substantially horizontal positions by adjusting the position of the cutting head relative to the shaft by an effective rotation of the cutter head 120° in one direction about the axis of rotation or 240° in another direction about the axis of rotation.

3. A trimmer comprising a cutting head housing a cutter means, and an elongate shaft for supporting the cutting head, the cutting head connected to the shaft by connection means permitting the cutting head to be positioned with its cutter means in either a substantially horizontal position or a substantially vertical position without disconnecting the cutting head and the shaft wherein the connection means defines a fixed axis of rotation oriented at an angle relative to a plane of rotation of the cutter means when the cutter means is positioned in the substantially horizontal position, wherein the cutting head is adjustable relative to the shaft and rotatable about the axis of rotation so that the cutter means is movable between the substantially horizontal position and the substantially vertical position by an effective rotation of the cutting head about the axis of rotation to a position corresponding to a 120° rotation of the cutting head in one direction about the axis of rotation.

4. A trimmer as claimed in claim 3, wherein the connection means is such that the cutting head is movable between positions in which its cutter means is substantially horizontal and substantially vertical in a single movement.

5. A trimmer as claimed in claim 3, wherein the connection means is constituted by a rotatable joint.

6. A trimmer as claimed in claim 5, wherein the rotatable joint is such that the cutting head is movable between positions in which its cutter means is substantially horizontal and substantially vertical about a single axis.

7. A trimmer as claimed in claim 5, wherein the axis of rotation of the rotatable joint lies in a first orientation that is substantially at 35.5° relative to the plane of rotation of the cutter means when the cutter means is in the substantially horizontal position, and the axis of rotation of the rotatable joint also lies in the first orientation when the cutting head is positioned with the cutter means in the substantially vertical position.

8. A trimmer as claimed in claim 3, wherein a rotatable cutter line constitutes the cutter means.

9. A trimmer comprising a cutting head housing a cutter means, a motor for driving the cutter means, and an elongate shaft for supporting the cutting head, the cutting head connected to the shaft by connection means permitting the cutting head to be positioned with its cutter means either substantially horizontal or substantially vertical without disconnecting the cutting head and the shaft, wherein the connection means is constituted by a rotatable joint that is constituted by a ball-and-socket joint, wherein the ball is fixed to the cutting head, the socket is defined by a generally spherical socket portion formed at the end of the shaft remote from the hand-grippable portion, and the motor is housed within the ball, the shaft having a hand-grippable portion at a position remote from the cutting head, the arrangement being such that the line joining a point within the hand-grippable portion and the connection means is substantially parallel to a plane of rotation of the rotational axis of the cutter means when the cutter means is generally perpendicular to the longitudinal axis of the elongated shaft.

10. A trimmer as claimed in claim 9, wherein the motor is an electric motor.

11. A trimmer as claimed in claim 9, further comprising a wheel rotatably mounted on the cutting head.

12. A trimmer as claimed in claim 11, wherein the axis of rotation of the wheel is substantially coincident with the axis of rotation of the cutter means.

13. A trimmer as claimed in claim 12, wherein the radius of the wheel is of the order of, but slightly less than, the effective radius of the cutter means.

\* \* \* \* \*